(12) United States Patent
Shong et al.

(10) Patent No.: US 9,112,218 B2
(45) Date of Patent: Aug. 18, 2015

(54) SOLID OXIDE FUEL CELL STACK MODULAR STRUCTURE

(75) Inventors: Wei-Ja Shong, Taoyuan County (TW);
Chien-Kuo Liu, Miaoli County (TW);
Szu-Han Wu, Taoyuan County (TW);
Peng Yang, Kaohsiung (TW);
Chien-Hsiung Lee, Taoyuan County (TW)

(73) Assignee: INSTITUTE OF NUCLEAR ENERGY RESEARCH ATOMIC ENERGY COUNCIL, EXECUTIVE YUAN, Taoyuan County (TW)

( * ) Notice: Subject to any disclaimer, the term of this patent is extended or adjusted under 35 U.S.C. 154(b) by 847 days.

(21) Appl. No.: 13/277,618

(22) Filed: Oct. 20, 2011

(65) Prior Publication Data

US 2012/0276467 A1 Nov. 1, 2012

(30) Foreign Application Priority Data

Apr. 29, 2011 (TW) .............................. 100115085 A

(51) Int. Cl.
*H01M 8/24* (2006.01)
*H01M 8/02* (2006.01)
*H01M 8/12* (2006.01)

(52) U.S. Cl.
CPC .......... *H01M 8/2425* (2013.01); *H01M 8/0273* (2013.01); *H01M 8/0282* (2013.01); *H01M 8/245* (2013.01); *H01M 2008/1293* (2013.01); *Y02E 60/50* (2013.01); *Y02E 60/525* (2013.01)

(58) Field of Classification Search
CPC ................... H01M 2008/1293; H01M 8/0273; H01M 8/2425; H01M 8/245; Y02E 60/525
USPC .................................. 429/452, 453, 457, 467
See application file for complete search history.

(56) References Cited

U.S. PATENT DOCUMENTS

2007/0111067 A1* 5/2007 Satou et al. ...................... 429/32
2010/0099003 A1* 4/2010 Ogawa et al. .................... 429/34

* cited by examiner

*Primary Examiner* — Ula C Ruddock
*Assistant Examiner* — Frank Chernow
(74) *Attorney, Agent, or Firm* — WPAT, PC; Justin King

(57) ABSTRACT

The present invention relates to a solid oxide fuel cell stack modular structure, in that, being an integration of a plurality of fuel cell modules, it can determine the amount of fuel cell modules to be stacked in the modular structure according to an actual power output demand while ensuring airtightness in the modular structure, and moreover, with the modularization design, each fuel cell module in the modular structure that is malfunctioning can be detached and removed easily from the stack individually so as to be replaced by another operative fuel cell module.

8 Claims, 6 Drawing Sheets

SOLID OXIDE FUEL CELL STACK MODULAR STRUCTURE

FIELD OF THE INVENTION

The present invention relates to a solid oxide fuel cell stack modular structure, in that, being an integration of a plurality of fuel cell modules, it can determine the amount of fuel cell modules to be stacked in the modular structure according to an actual power output demand while ensuring airtightness in the modular structure, and moreover, with the modularization design, each fuel cell module in the modular structure that is malfunctioning can be detached and removed easily from the stack individually so as to be replaced by another operative fuel cell module.

BACKGROUND OF THE INVENTION

Conventionally, the fuel cells stacked in the same fuel cell stack are all orientated toward the same direction, i.e. either all being arranged with their anode facing upward and cathode facing downward, or the other way around. In addition, since for each fuel cell in the stack, it is required to have fuel gas flowing only through its anode and oxidant gas flowing only through its cathode without causing the fuel gas to mix with the oxidant gas, any two neighboring fuel cells are generally being separated from each other by the use of interconnect having gas grooves machined thereon. However, the machining cost in addition to the material cost of the interconnect used in those conventional fuel cell stacks will directly cause the overall manufacturing cost of the fuel cell stack to increase, not to mention that the overall volume of the fuel cell stack will increase also. In addition, since typically a group of individual fuel cells along with their interconnect are welded, soldered or otherwise bonded together into a single unitary stack by the use of a specific sealing material, accordingly if one cell fails to function normally and must be removed and replaced, not only the removal of such a malfunctioning fuel cell can be a very difficult task, but also it is more than likely that the remaining fuel cells are destroyed in the process. This leads to significant losses in time and money.

SUMMARY OF THE INVENTION

In view of the disadvantages of prior art that in addition to the material cost of the interconnect itself, the use of interconnect that is commonly seen in conventional fuel cell stacks for separating neighboring fuel cells from each other will cause the overall manufacturing cost of the fuel cell stack to increase, not to mention that it is difficult just to replace one malfunctioning fuel cell in the conventional fuel cell stack as individual fuel cells along with their interconnect are generally being welded, soldered or otherwise bonded together into a single unitary stack by the use of certain specific sealing materials in conventional fuel cell stacks. Accordingly, the primary object of the present invention is to provide a solid oxide fuel cell stack modular structure for overcoming the aforesaid shortcomings.

In an embodiment, the present invention provides a solid oxide fuel cell stack modular structure, which comprises:
at least one cell module, each further comprising:
two cell units, each being configured with:
a metal frame, having a wiring hole, a fuel hole and a fuel channel in a manner that the wiring hole is arranged at a position proximate to the edge of the metal frame, the fuel hole is arranged at a side of the metal frame while allowing the fuel channel to protrude out of the metal frame from the other side at a position corresponding to the fuel hole;
a cell, being formed with an anode surface and a cathode surface, while being fixed to the center of the metal frame by the use of a fixing agent;
an anode conductive grid, adhered to both the anode surface of the cell and the corresponding surface of the metal frame simultaneously by the use of a conductive adhesive; and except for the area on the corresponding surface of the metal frame that is adhered to the anode conductive grid and the surface area of the wiring hole, allowing the rest surface area of the metal frame to be coated by an insulation material; and
a cathode conductive grid, formed with a conductive bar attached to an edge thereof, being adhered to the cathode surface of the cell by the use of a conductive adhesive;
a bottom plate, further comprising:
a wiring hole, to be used for connecting electrically to the conductive bar of its neighboring cell module;
a fuel channel, protrudingly arranged at a side of the bottom plate in a size the same as the fuel channels of the cell module for allowing the fuel channel to be coupled tightly with the fuel hole of its neighboring cell module; and
a fuel hole, arranged at the other side of the bottom plate that is opposite to the fuel channel in a size the same as the fuel holes of the cell module for allowing the fuel channel of its neighboring cell module to couple tightly therewith;
and
a top plate, formed with a wiring hole to be used for connecting electrically to the wiring hole of its neighboring cell module while allowing no fuel channel of its neighboring cell module to be connected with the top plate, i.e. one cell unit in the two cell units of the cell module that is arranged closest to the top plate can be formed without the fuel hole and the fuel channel;
wherein, the two cell units that are spaced from each other by the use of a plurality of spacers fixedly placed therebetween are arranged in parallel with each other in a manner that the anode surfaces of the two are orientated facing toward each other, while allowing the assembly of the two cell units to be sealed together by a sealing agent for forming a sealed space therebetween, and simultaneously allowing the two anode conductive grids of the two cell units to be separated from each other by the use of a plurality insulation pieces that are fixedly placed therebetween, and also allowing the conductive bar of one cell unit selected from the two cell units to be connected with the wiring hole of another cell unit by the use of a wire; and when the solid oxide fuel cell stack modular structure is composed of a plurality of such cell modules, the plural cell modules are stacked together while allowing the fuel channel and fuel hole of any one cell module to be connected respectively to the corresponding fuel hole of one of its two neighboring cell modules in the stacking and the corresponding fuel channel of its another neighboring cell module, and simultaneously allowing the use of two wires for connecting the wiring hole and conductive bar of any one cell module respectively to the corresponding conductive bar of one of its two neighboring cell module in the stacking and the corresponding wiring hole of its another neighboring cell module; and the bottom plate is fixedly bound together with the top plate by the use of a plurality of first fixing elements while enabling the four sides of the so-established bound structure to be enclosed by four side plates as each side plate is fixed to the so-established bound structure by the use of a plurality of second fixing elements.

To sum up, the present invention provides a solid oxide fuel cell stack modular structure, in that, being an integration of a plurality of fuel cell modules, it can determine the amount of fuel cell modules to be stacked in the modular structure according to an actual power output demand while ensuring airtightness in the modular structure, and moreover, with the modularization design, each fuel cell module in the modular structure that is malfunctioning can be detached and removed easily from the stack individually so as to be replaced by another operative fuel cell module.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

The present invention relates to a solid oxide fuel cell stack modular structure 1. However, the description relating to a cell module 11 is provided in advance for clarity and illustration.

Figure 1:
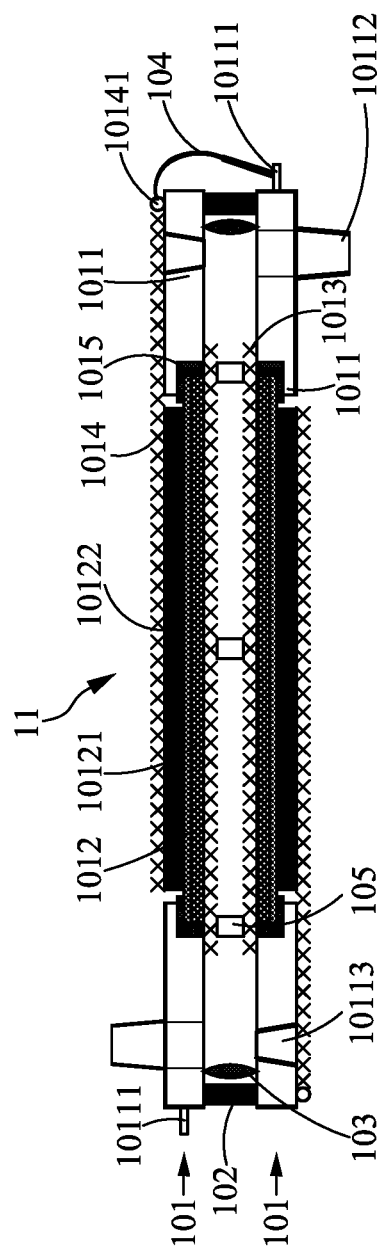
FIG. 1 is a schematic view of a cell module used in the present invention.
Figure 3A:
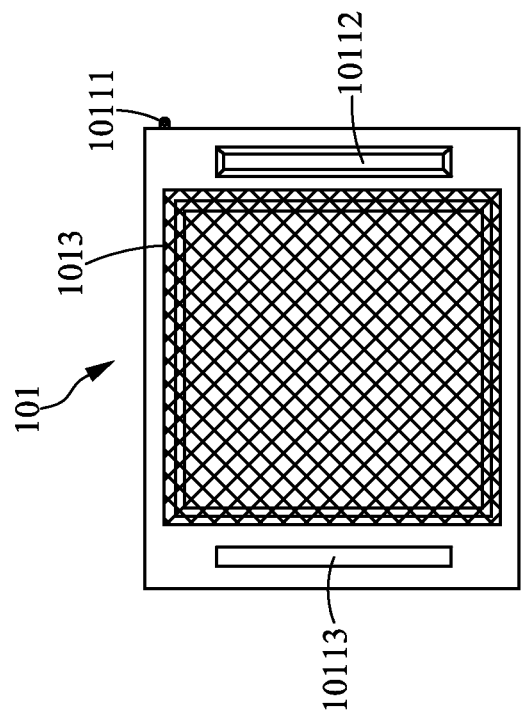
FIG. 3A and FIG. 3B are schematic diagrams showing a cell unit used in the present invention whose anode surface is orientated facing upward.
Figure 3B:
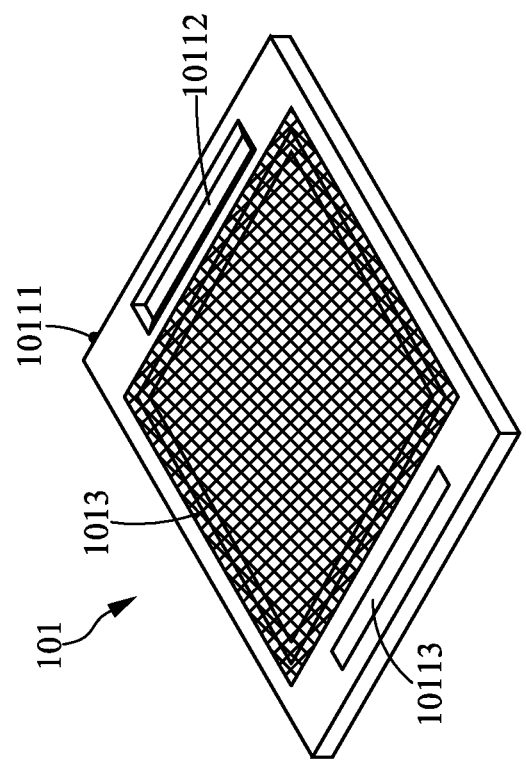
Figure 4A:
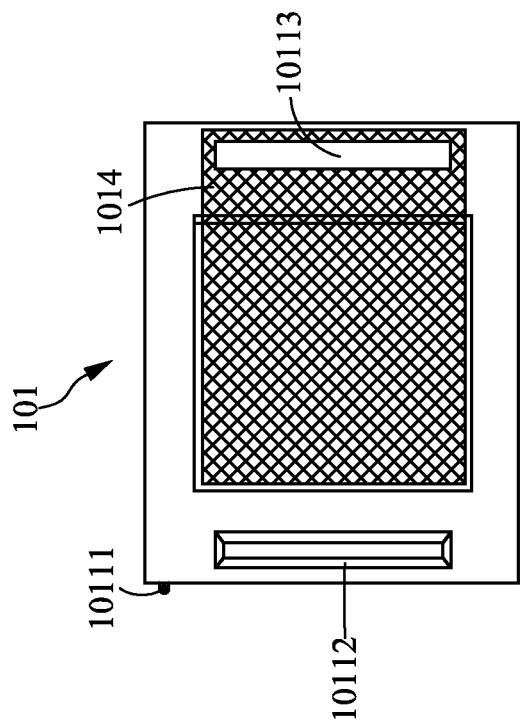
FIG. 4A and FIG. 4B are schematic diagrams showing a cell unit used in the present invention whose cathode surface is orientated facing upward.
Figure 4B:
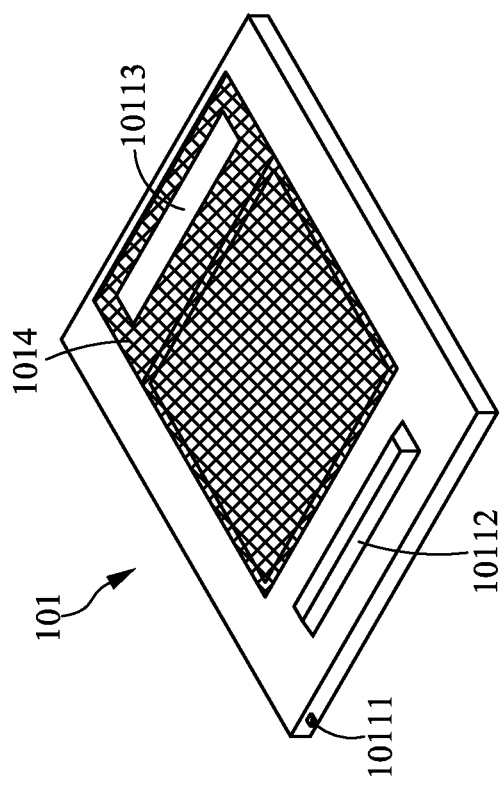

As shown in FIG. 1, FIG. 3 and FIG. 4, the cell module 11 is composed of two cell units 101, and each of which further comprises: a metal frame 1011, a cell 1012, an anode conductive grid 1013 and a cathode conductive grid 1014. Moreover, the cell 1012, being formed with an anode surface 10121 and a cathode surface 10122, is fixed to the center of the metal frame 1011 by the use of a fixing agent 1015; the anode conductive grid 1013 is arranged adhering to both the anode surface 10121 of the cell 1012 and a corresponding surface of the metal frame 1011 simultaneously by the use of a conductive adhesive for allowing the metal frame 1011 to connect electrically with the anode surface 10121 of the cell module 11; and the cathode conductive grid 1014, which is formed with a conductive bar 10141 attached to an edge thereof, is adhered to the cathode surface 10122 of the cell 1012 by the use of a conductive adhesive. In addition, the metal frame 1011 is configured with a wiring hole 10111, a fuel channel 10112 and a fuel hole 10113 in a manner that the wiring hole 10111 is arranged at a position proximate to the edge of the metal frame 1011, the fuel hole 10113 is arranged at a side of the metal frame 1011 while allowing the fuel channel 10112 to protrude out of the metal frame 1011 from the other side at a position corresponding to the fuel hole 10113. In this embodiment, the fuel hole 10113 is formed in a size just large enough for allowing the fuel channel 10112 of its neighboring cell module to couple tightly therewith; and except for the area on the corresponding surface of the metal frame 1011 that is adhered to the anode conductive grid 1013 and the surface area of the wiring hole 10111, the rest surface area of the metal frame 1011 is coated by an insulation material, such as aluminum oxide.

In this embodiment, the two cell units 101 are arranged in parallel with each other in a manner that the anode surfaces 10121 of the two are orientated facing toward each other, and also the two cell units 101 are spaced from each other by a plurality of spacers 102 that are fixedly placed therebetween, whereas the assembly of the two cell units 101 and the plural spacers 102 are further sealed together by a sealing agent for allowing a sealed space between the two cell units 101 that is provided for fuel to flow therethrough. Moreover, the conductive bar 10141 of one cell unit 101 selected from the two cell units 101 is connected to the wiring hole 10111 of the other cell unit 101 by the use of a wire 104 so as to achieve an electrical connection between the two cell units 101. In addition, there is a plurality of insulation pieces 105 sandwiched between the anode conductive grids 1013 of the two cell units 101 for separating the two anode conductive grids 1013 from each other.

Figure 2:
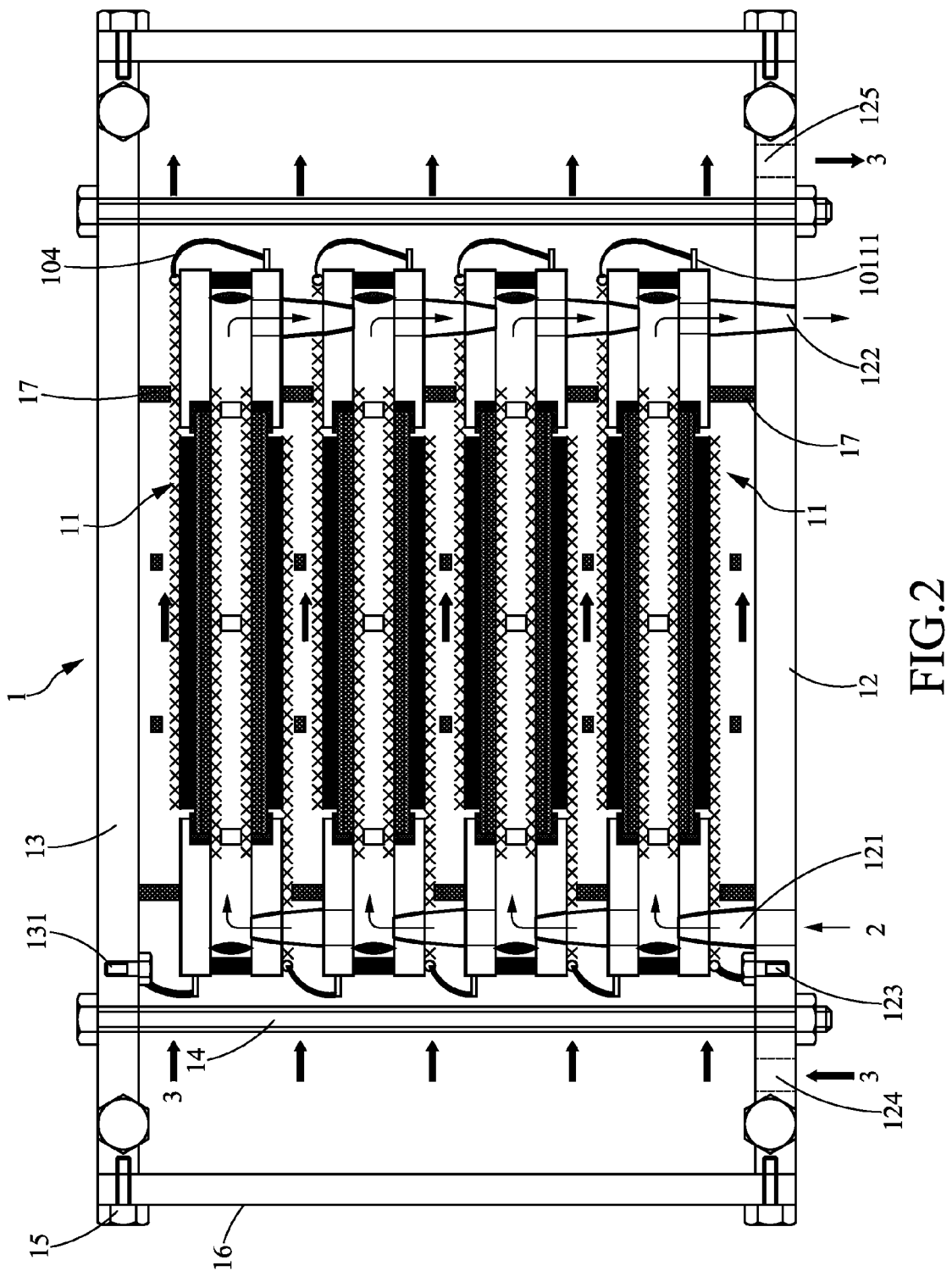
FIG. 2 is a schematic diagram showing a solid oxide fuel cell stack modular structure according to the embodiment of the invention.
Figure 5:
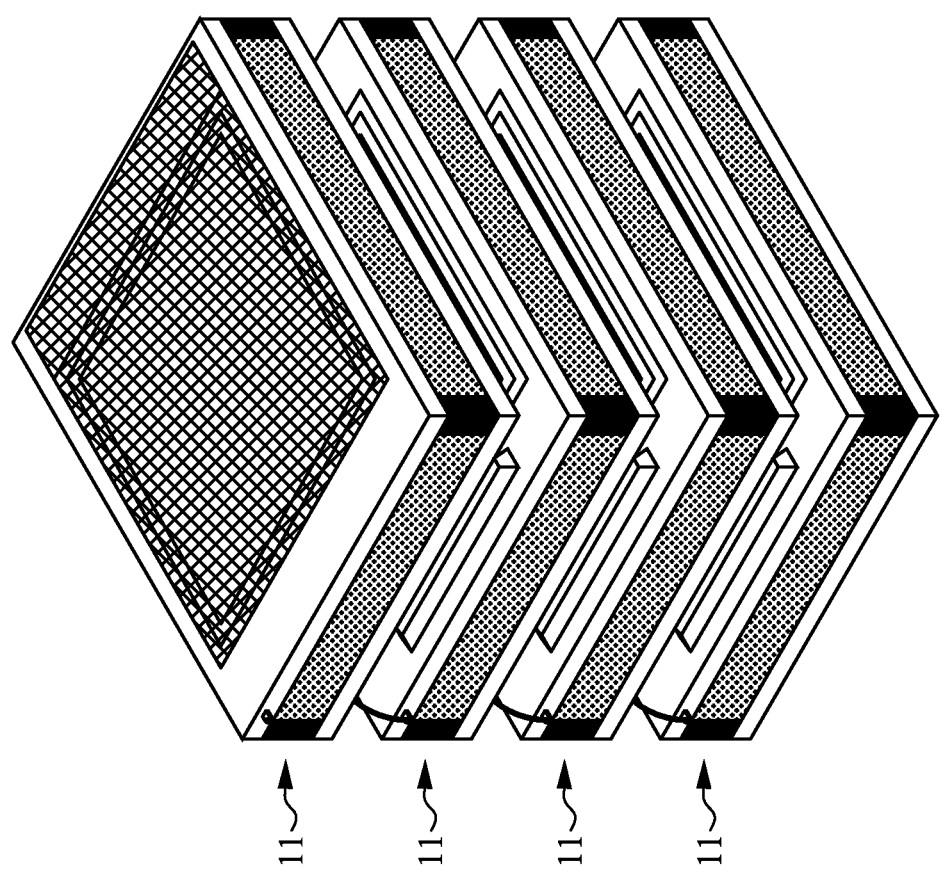
FIG. 5 is a three-dimensional view of a solid oxide fuel cell stack modular structure of the invention without being enclosed inside the top plate, bottom plate and side plates.
Figure 6:
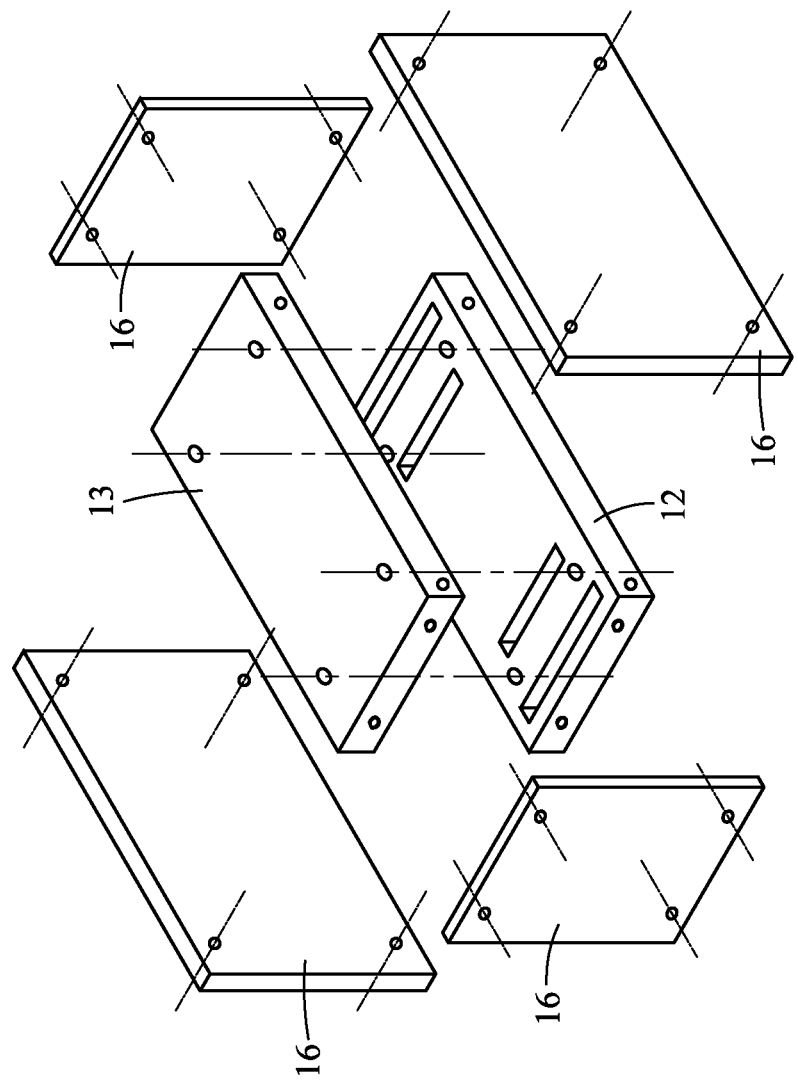
FIG. 6 is a schematic diagram showing how the top plate, bottom plate and side plates are assembled.

In another embodiment shown in FIG. 2, FIG. 5 and FIG. 6, the solid oxide fuel cell stack modular structure 1 can have more than one cell module 11 embedded therein, and in this embodiment, there are four cell modules 11 included in the solid oxide fuel cell stack modular structure 1. Moreover, in this embodiment, the four cell modules 11 are stacked together while allowing the fuel channel 10112 and fuel hole 10113 of any one cell module 11 to be connected respectively to the corresponding fuel hole 10113 of one of its two neighboring cell module in the stacking and the corresponding fuel channel 10112 of its another neighboring cell module 11, and simultaneously allowing the use of two wires 104 for connecting the wiring hole 10111 and conductive bar 10141 of any one cell module 11 respectively to the corresponding conductive bar 10141 of one of its two neighboring cell module 11 in the stacking and the corresponding wiring hole 10111 of its another neighboring cell module 11.

In this embodiment, the solid oxide fuel cell stack modular structure 1 further comprises: a bottom plate 12 and a top plate 13 that are arranged for allowing the two to work cooperatively for sandwiching the stacking of the four cell modules 11 therebetween. In detail, the bottom plate 12 is configured with a fuel channel 121 and a fuel hole 122, in that the fuel channel 121 and the fuel hole 122 are respectively formed in a size the same as the fuel channels 10112 and the fuel holes 10113 of the cell modules 11 for allowing the fuel channel 121 and fuel hole 122 to be coupled tightly respectively with the fuel hole 10113 and the fuel channel 10112 of its neighboring cell module 11. Thereby, fuel 2 can be fed into the fuel cell stack modular structure 1 through the fuel channel 121 and then flow out of the fuel cell stack modular structure 1 through the fuel hole 122. In addition, the bottom plate further comprises: an inlet 124 and an outlet 125, which are provided for oxidant to flow in and out the fuel cell stack modular structure 1 respectively. Moreover, the bottom plate is further configured with a wiring hole 123, which is connected to the conductive bar 10141 of its neighboring cell module 11 by the use of a wire 104.

As shown in FIG. 2, the top plate 13 is configured with a wiring hole 131, which is connected to the wiring hole 10111 of its neighboring cell module 11 by the use of a wire 104. In addition, the top plate 13 is not in fluid communication with its neighboring cell module 11 through any fuel channel, and thus the one cell unit 101 in the two cell units 101 of the cell module 11 that is arranged closest to the top plate 13 can be formed without the fuel hole and the fuel channel.

As shown in FIG. 2 and FIG. 6, the bottom plate 12 is fixedly bound together with the top plate 13 by the use of a plurality of first fixing elements 14, such as bolts, while enabling the four sides of the so-established bound structure to be enclosed by four side plates 16 as each side plate 16 is fixed to the so-established bound structure by the use of a plurality of second fixing elements 15, such as screws.

In addition, there are a plurality of insulation spacers 17 being fixedly placed between the bottom plate 12 and its neighboring cell module 11, between the top plate 13 and its neighboring cell module 11, as well as between neighboring cell modules 11.

It is noted that each of the insulation pieces 105, the spacers 102 and the insulation spacers 17 can be made of aluminum oxide; and the sealing agent 103 can be a material selected from the group consisting of glass ceramics and mica; while the fixing agent 1015 can substantially be glass ceramics.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A solid oxide fuel cell stack modular structure, comprising:
    a plurality of cell modules, each comprising:
        two cell units, each being configured with:
            a metal frame, having a wiring hole, a fuel hole and a fuel channel in a manner that the wiring hole is arranged at a position proximate to the edge of the metal frame, the fuel hole is arranged at a side of the metal frame while allowing the fuel channel to protrude out of the metal frame from the other side at a position corresponding to the fuel hole;
            a cell, being formed with an anode surface and a cathode surface, while being fixed to the center of the metal frame by the use of a fixing agent;
            an anode conductive grid, adhered to both the anode surface of the cell and the corresponding surface of the metal frame simultaneously by the use of a conductive adhesive; and except for the area on the corresponding surface of the metal frame that is adhered to the anode conductive grid and the surface area of the wiring hole, allowing the rest surface area of the metal frame to be coated by an insulation material; and
            a cathode conductive grid, formed with a conductive bar attached to an edge thereof, being adhered to the cathode surface of the cell by the use of a conductive adhesive;
        a bottom plate, comprising:
            a wiring hole, to be used for connecting electrically to the conductive bar of the cell module closest to the bottom plate;
            a fuel channel, protrudingly arranged at a side of the bottom plate in a size the same as the fuel channels of the cell module for allowing the fuel channel to be coupled tightly with the fuel hole of the cell module closest to the bottom plate; and
            a fuel hole, arranged at the other side of the bottom plate that is opposite to the fuel channel in a size the same as the fuel holes of the cell module for allowing the fuel channel of the cell module closest to the bottom plate to couple tightly therewith; and
        a top plate, formed with a wiring hole to be used for connecting electrically to the wiring hole of the cell module closest to the top plate while allowing no fuel channel of the cell module closest to the top plate to be connected with the top plate;
    wherein, the two cell units that are spaced from each other by the use of a plurality of spacers fixedly placed therebetween are arranged in parallel with each other in a manner that the anode surfaces of the two are orientated facing toward each other, while allowing the assembly of the two cell units to be sealed together by a sealing agent for forming a sealed space therebetween, and simultaneously allowing the two anode conductive grids of the two cell units to be separated from each other by the use of a plurality insulation pieces that are fixedly placed therebetween, and also allowing the conductive bar of one cell unit selected from the two cell units to be connected with the wiring hole of another cell unit by the use of a wire;
    wherein, the plural cell modules are stacked together while allowing the fuel channel and fuel hole of any one cell module to be connected respectively to the corresponding fuel hole of one of the two cell modules adjacent to the cell module in the stacking and the corresponding fuel channel of the other of the two cell modules adjacent to the cell module, and simultaneously allowing the use of two wires for connecting the wiring hole and conductive bar of any one cell module respectively to the corresponding conductive bar of one of the two cell modules adjacent to the cell module in the stacking and the corresponding wiring hole of the other of the two cell modules adjacent to the cell module in the stacking; and the bottom plate is fixedly bound together with the top plate by the use of a plurality of first fixing elements while enabling the four sides of the so-established bound structure to be enclosed by four side plates as each side plate is fixed to the so-established bound structure by the use of a plurality of second fixing elements.

2. The solid oxide fuel cell stack modular structure of claim 1, wherein there are a plurality of insulation spacers being fixedly placed between the bottom plate and the cell module closest to the top plate, between the top plate and the cell module closest to the top plate, as well as between adjacent cell modules.

3. The solid oxide fuel cell stack modular structure of claim 1, wherein each of the fuel channels formed on the cell modules and the fuel channel formed on the bottom plate are formed like a cone.

4. The solid oxide fuel cell stack modular structure of claim 2, wherein each of the fuel channels formed on the cell modules and the fuel channel formed on the bottom plate are formed like a cone.

5. The solid oxide fuel cell stack modular structure of claim 1, wherein the sealing agent is a material selected from the group consisting of glass ceramics and mica; and the fixing agent is substantially glass ceramics.

6. The solid oxide fuel cell stack modular structure of claim 2, wherein the sealing agent is a material selected from the group consisting of glass ceramics and mica; and the fixing agent is substantially glass ceramics.

7. The solid oxide fuel cell stack modular structure of claim 1, wherein each of the insulation materials, the spacers and the insulation spacers are made of aluminum oxide.

8. The solid oxide fuel cell stack modular structure of claim 2, wherein each of the insulation materials, the spacers and the insulation spacers is made of aluminum oxide.

\* \* \* \* \*